United States Patent [19]

Menjo et al.

[11] Patent Number: 4,748,062
[45] Date of Patent: May 31, 1988

[54] DECORATIVE MEMBER HAVING TRANSPARENT LAYER WITH LENS EFFECT

[75] Inventors: Yoshihiro Menjo; Seiji Kobayashi; Takuji Nagata; Hiroshi Ohashi; Yoshiharu Kanamori, all of Aichi, Japan

[73] Assignees: Toyoda Gosei Co., Ltd., Nishikasugai; Toyota Jidosha Kabushiki Kaisha, Toyota, both of Japan

[21] Appl. No.: 924,339

[22] Filed: Oct. 29, 1986

[30] Foreign Application Priority Data

Oct. 31, 1985 [JP] Japan .............................. 60-168950[U]

[51] Int. Cl.$^4$ ..................... A44C 25/00; B44F 1/00; B60R 13/04
[52] U.S. Cl. .................................. 428/46; 40/315; 428/28; 428/31; 428/67
[58] Field of Search ............. 428/31, 13, 28, 30, 428/46, 67; 40/315

[56] References Cited

U.S. PATENT DOCUMENTS

| | | | |
|---|---|---|---|
| 3,606,432 | 9/1971 | Honatzis | 428/31 X |
| 3,881,042 | 4/1975 | Ungerer | 428/31 X |
| 4,113,295 | 9/1978 | Wenrick | 428/31 X |
| 4,446,179 | 5/1984 | Waugh | 428/31 |
| 4,520,053 | 5/1985 | Marentic | 428/31 |

Primary Examiner—Henry F. Epstein
Attorney, Agent, or Firm—Cushman, Darby & Cushman

[57] ABSTRACT

In a decorative member having a transparent layer with a lens effect, a base having a decorative face is covered with the transparent layer with a lens effect. A chevron projection is continuously provided on the boundary between faces constituting the decorative face to emphasize the intersection of the faces.

4 Claims, 2 Drawing Sheets

DECORATIVE MEMBER HAVING TRANSPARENT LAYER WITH LENS EFFECT

BACKGROUND OF THE INVENTION

This invention relates to a decorative member having a decorative face on the surface of its base and a transparent layer covering the decorative face with a lens effect and more particularly to a technique for use in preparing personal outfittings such as buttons, cuffs, pendents; utility articles such as nail clippers and key holders; and outer automobile decorative parts such as side molding and ornaments.

Of decorative members of the sort described above, those for use in automobiles must meet the most severe quality requirements in view of actual environmental conditions. Taking side molding as an example, Japanese Patent Application (OPI) No. 221741/83 discloses those shown in FIGS. 1 through 3.

FIG. 1 is a perspective view showing the basic construction of a conventional decorative member, which is prepared by forming a channel 2 on the surface of an extrusion-molded base 1 in a continuous length, arranging a solid decorative face 4 on the surface of a floor 3 through the channel 2 in one body or separately and further forming a transparent layer 5 with a lens effect in such a manner as to cover the decorative face 4, an adhesive layer 6 and separate paper 7 being provided on the underside of the base 1 for sticking the above combination to the body of an automobile.

FIG. 2 is a sectional view showing the basic construction of another conventional decorative member. Unlike the one shown above, this decorative member has not a base 1 but a transparent layer 5 on the surface of a foil member 8, an adhesive layer 6 and a separate paper 7 on the underside of the adhesive layer 6.

FIG. 3 is a sectional view showing the basic construction of still another conventional decorative member, which is formed of an extrusion-molded base 1, a transparent layer 5 provided on the surface of a foil member 8 shown in FIG. 2. The decorative member is equipped with an adhesive layer 6 stuck onto the underside of the base 1.

The transparent layer 5 in the case of each above-described decorative member is formed through the method disclosed by Japanese Pat. No. 37492/77 or one similar thereto, the method comprising blending unhardened resin (e.g., unsaturated polyester) with a hardening agent in a given percentage, pouring the mixture onto the decorative face 4 of the base 1 to form the unhardened resin into a transparent layer with the flow properties and surface tension, and hardening the product by heating it.

FIG. 4 shows a concrete example of the above decorative member applied as vehicular side molding. In constrast to the basic construction of FIG. 1, the base 1 has no channel 2 but a flat decorative face 4 and the transparent layer 5 is so formed as to cover the decorative face 4. The adhesive layer 6 as well as the separate paper 7 (not shown) is also stuck to the underside of the base 1 as in the case of FIG. 1.

In the decorative member shown in FIG. 4, the lens effect of the transparent layer 5 is not satisfactorily utilized since the decorative face 4 is flat and its decorative expression tends to be monotonous. It is therefore called for to provide the decorative face 4 with solid decoration by making the decorative face 4 rugged, as shown in FIG. 5.

During the process of making the decorative face 4 rugged, when the transparent layer 5 is poured onto the decorative face 4, air is dragged in the corners (edges) of the rugged portions on the surface of the decorative face 4 and apt to be left in the edges of the rugged portions, thus forming tiny air bubbles a resulting from the air thus left unremoved until the decorative member is completely hardened. Moreover, such air bubbles a tend to produce craters or so-called sink marks, waves on the surface of the transparent layer 5 because of the difference in liner material expansion and changes in its volume as the temperature of the bubbles a changes.

FIG. 6 shows another concrete example of the decorative member in the form of a partial sectional view parallel to the longitudinal direction thereof. In contrast to what is shown in FIG. 1, the base 1 has not the channel 2 and the decorative face 4 is bent at an obtuse angle in the portion close to its end, whereas two faces 9, 10 constituting the decorative face 4 intersect in that portion. The adhesive layer 6 and the separate paper 7 of FIG. 1 are omitted in FIG. 6. If the faces 9, 10 constituting the decorative face 4 of the decorative member are not linear, excessive resin will flow into the portion of the face 10 under the influence of gravity when unhardened resin is poured onto the surface and consequently the transparent layer 5 uniform in thickness as shown in FIG. 6 is unobtainable. Conventionally, a decorative member having a flat decorative face 4 is formed first as shown in FIG. 7 and a portion close to the end thereof is bent to obtain what has the faces 9, 10 shown in FIG. 6.

The decorative member of FIG. 6 thus obtained has roundness in its bent portion 11 where the faces 9, 10 of the decorative face 4 intersect. The roundness is unavoidably produced because of the following reasons: the base 1 has a certain thickness; the tensile stress produced in the longitudinal direction of the bent portion results in a slim thickness d in the direction of thickness; and so forth. As a result, it has been impossible to obtain a decorative member with such a decorative effect as is capable of providing a sharply bent portion 11.

SUMMARY OF THE INVENTION

The present invention is intended to solve the above problems and it is therefore an object of the invention to provide a decorative member having a transparent layer with not only such a decorative effect as is capable of providing a sharply bent portion but also a lens effect.

The decorative member having the transparent layer with a lens effect and a base having a decorative face covered with the transparent layer with such a lens effect is supplied with continuous chevron projections emphasizing the intersection of both element surfaces on the boundary between the faces constituting the decorative face.

Since the sharp chevron projections are provided on the boundary between the faces constituting the decorative face according to the present invention, these projections are emphasized by the lens effect of the transparent layer and demonstrate a decorative effect in the form of a sharply bent portion.

DETAILED DESCRIPTION OF THE INVENTION

Referring now to the accompanying drawings, an embodiment of the present invention applied to vehicular side molding having a decorative member having a transparent layer with a lens effect will be described.

Figure 1:
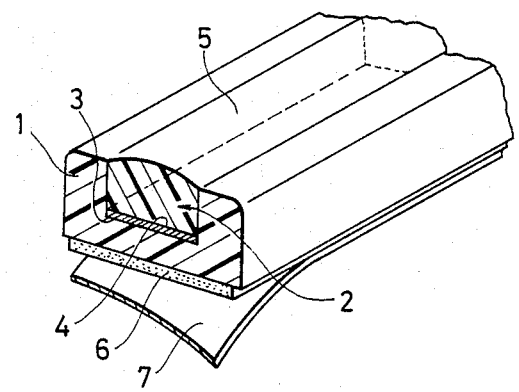
FIG. 1 is a perspective view showing the basic construction of a conventional decorative member.
Figure 2:
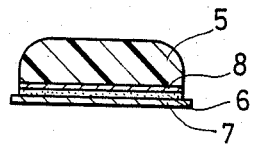
FIGS. 2, 3 are sectional views showing the basic construction of conventional decorative members.
Figure 3:
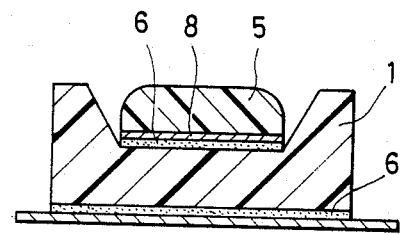
Figure 4:
FIG. 4 is a sectional view of a conventional decorative member having a flat decorative face.
Figure 5:
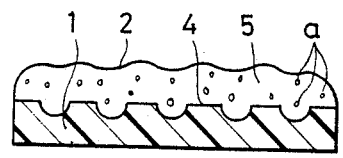
FIG. 5 is a sectional view of a conventional decorative member having a rugged decorative surface.
Figure 6:
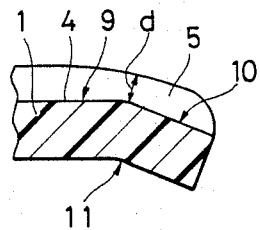
FIG. 6 is a partial sectional view of a conventional decorative member.
Figure 7:
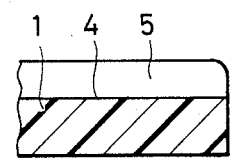
FIG. 7 is a partial sectional view showing a state prior to the decorative member bending process of FIG. 6.
Figure 8:
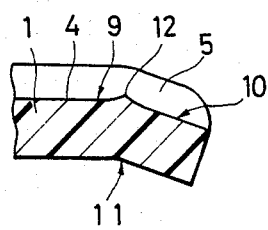
FIG. 8 is a partial sectional view showing a decorative member equipped with the transparent layer with a lens effect and applied as side molding to an automobile.
Figure 9:
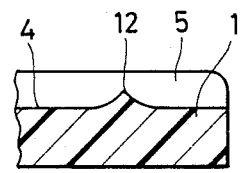
FIG. 9 is a partial sectional view showing a state prior to the decorative member bending process of FIG. 8.

FIG. 8 is a partial sectional view of a decorative member having a transparent layer with a lens effect according to the present invention and applied as vehicular side molding, whereas FIGS. 9 is a partial sectional view showing the state wherein the decorative member of FIG. 8 is subjected to the bending process.

The vehicular side molding according to the embodiment basically comprises a base 1 as a basically extrusion-molded continuous plastic part and a transparent layer 5 covering the surface of the base 1. It is stuck to an automobile side body through an adhesive layer (not shown) provided on the underside of the base 1.

Polyvinyl chloride (PVC) or acrylonitrile-butadiene-styrene terpolymer (ABS) is used as the base 1, whose surface is employed as a decorative face 4. The decorative face 4 is bent at an obtuse angle in the each portion close to the end of the decorative member and two faces 9, 10 constituting the decorative face intersect in the bent portion 11. A chevron projection 12 crossing the base 1 at a sharp angle is continously provided in the width direction (short axial direction) of the base 1 so as to stress the intersection of the faces 9, 10 on the boundary therebetween.

Although the above base 1 according to this embodiment is made of synthetic resin, a combination of synthetic resin and an metal insert or a metal plate may be used as occasion demands.

The transparent layer 5 is a transparent resin covering the decorative face 4 and provided on the surface of the base 1 and, in this embodiment, polyurethane resin is employed because of its excellent adhesion with PVC forming the base 1. The surface of the transparent layer 5 is parallel to the surface of the base 1 in its center and almost cylindrical on its periphery.

The decorative member shown in FIG. 8 is obtained by bending the decorative member in a predetermined position, the latter having the transparent layer 5 on the flat base 1 shown in FIG. 9.

The base 1 of FIG. 9 has the same transverse sectional shape as that of FIG. 8 and its dimension in the longitudinal direction is determined by the dimension obtained after the bending process. The chevron projection 12 about 0.5 mm high is continuously formed in a position corresponding to the bent portion 11 in the width direction of the base 1 along the boundary between the faces 9, 10 of the base 1. The transparent layer 5 covering the decorative face 4 as the surface of the base 1 has the same thickness of the transparent layer 5 of FIG. 8.

The transparent layer 5 is prepared by mixing a desired percentage of the polyol and isocyanate components of polyurethane resin heated at 40° C.~80° C. using a mixing head, deaerating the mixture under reduced pressure, pouring the mixture onto one up to the other end of the decorative face 4 of the base 1 preheated at 40° C.~80° C. likewise and moved under the mixing head and hardening it at an atmospheric temperature of 80° C. The viscosity of the polyurethane resin decreases once during the hardening process and air bubbles dragged in during the pouring process are removed so as to make the surface smooth. The viscosity increases as the reaction proceeds and the resin hardens for about one hour and is completely incorporated in the base 1. In addition to the thermosetting resin such as polyurethane and unsaturated polyester resin, thermoplastic resin such as acrylic resin may be dissolved in a solvent and used as the transparent layer 5. Accordingly, the hardening of the transparent layer 5 of FIG. 9 means not only crosslinking reaction but also the increase of resin viscosity by the volatilization of the solvent.

When the decorative member thus formed as shown in FIG. 9 is bent at a given angel centering around the projection 12 corresponding to the bent portion 11, the surface of the transparent layer 5 produces large roundness. However, a projection slightly lower than what is shown in FIG. 9 is left in the bent portion 11 as shown in FIG. 8. The surface of the decorative face 4 corresponding to the bent portion 11 is affected by the projection greater than the roundness then produced and it looks as if the base were bent at a sharp angle.

As set forth above, the decorative member provided with the continuous chevron projection 12 emphasizing the intersection of both faces 9, 10 constituting the decorative face 4 on the boundary between them allows large roundness to be produced on the surface of the transparent layer 5 corresponding to the bent portion 11. However, because the chevron projection 12 exists in the bent portion 11 of the decorative face 4, the projection 12 is stressed by the lens effect of the transparent layer 5 and the bent portion 11 of the decorative member looks sharply bent.

Although the whole base is bent with the boundary between the faces 9, 10 constituting the decorative face as the center in the above embodiment, the same effect can be anticipated by applying the present invention to the faces being adjacent to each other on the flat decorative face as a whole and constituting the decorative face.

When the chevron projection emphasizing the intersection of both the faces is provided on the boundary where the faces consitute the surface of the decorative face continuously in the width direction of the base, the base looks as if it were bent at a sharp angle. Moreover, a character or graphic display and another face forming it can be made to look separate from each other by employing the boundary where the faces join on the surface forming the decorative face as a character or graphic boundary.

Referring the accompanying drawings, another embodiment of the present invention will be described.

Figure 10:
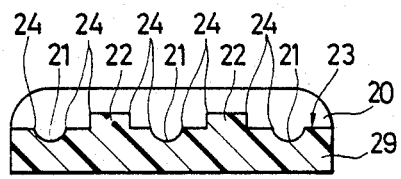
FIG. 10 is a sectional view of another decorative member embodying the present invention.

FIG. 10 is a sectional view of a decorative member applied to a side molding of an automobile according to the present invention as an example of the decorative member having a transparent layer with a lens effect. As shown in FIG. 10, the side molding of an automobile according to this embodiment comprises an extrusion-molded continuous plastic base 29, a decorative face 23 formed on the base and a transparent layer 20 covering the surface of the decorative face 23. The side braid for use is stuck to the side body of an automobile by an adhesive layer or conventional means (not shown) for sticking the base 29 provided on the rear side thereof.

Figure 11:
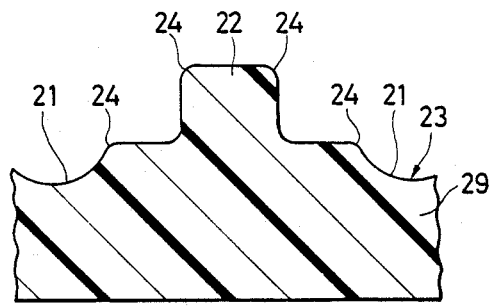
FIG. 11 is a partial enlarged sectional view of the base of FIG. 10.

Polyvinyl chloride (PVC) or acrylonitrile-butadiene-styrene terpolymer (ABS) is used for the base 29 whose surface over the whole length is employed as a decorative face 23 provided with a decoration bearing solid ruggedness consisting of an arcuate concave portion 21 and a convex portion 22 rectangular in cross section. The edges 24 of angles formed in the concave and convex portions 21, 22 is thoroughly finished at 0.2 R as shown in FIG. 11.

The transparent layer 20 which is a transparent resin layer covering the decorative face 23 and provided on the surface of the base 29 is made of polyurethane resin congenial to PVC forming the base 29 in terms of adhesion. The central portion of the surface of the transparent layer 20 is flat because of surface tension and the portion on the periphery of the base 29 is akin to a cylindrical face. However, the contour of the surface of the transparent layer 20 changes from being lenslike cylindrical as a whole up to being alike to what is shown in the drawings, depending on the visocity and setup characteristics of polyurethane resin when it hardens, the amount of polyurethane resin poured and the width of the base 29, as will be described later.

The transparent layer 20 provided on the surface of the base 29 is prepared by mixing a desired percentage of the polyol and isocyanate components of polyurethane resin heated to 40° C.~80° C. by a mixing head, deaerating the mixture under reduced pressure, preheating the mixture at 40° C.~80° C. likewise, pouring the mixture onto the whole length of the decorative face 13 of the base 9 moving under the mixing head and then hardening the mixture at an atmospheric temperature of 80° C.

During the hardening process, the viscosity of polyurethane resin reduces once and traces of bubbles dragged in during the pouring process are allowed to fly out. The surface of the transparent layer 20 is thus smoothed and the viscosity of the resin increases as the reaction proceeds, whereby it hardens for about one hour and is completely incorporated in the base 29.

As the transparent layer 20, thermoplastic resin such as acrylic resin in addition to the thermosetting such as the polyurethane resin and unsaturated polyester resin may be dissolved in a solvent and used. In other words, the hardening of the transparent layer 20 means not only crosslinking reaction but also the increase of the viscosity of the resin through the evaporation of the solvent. The deaeration of the transparent layer 20 provided on the surface of the base 29 under reduced pressure may be made by mixing a desired percentage of polyurethane resin heated to 40° C.~80° C., pouring the mixture onto the whole length of the decorative face 23 of the base moving under a mixing head and hardening the mixture at an atomospheric temperature of about 80° C. without deaerating it under reduced pressure. Anyway, the transparent layer 20 may be formed with fluid resin in the present invention.

To be concrete, the decorative face 23 with a roundness of over 0.2 R at the corner edge of the solid rugged portion according to the present invention includes one including characters.

In the decorative member thus constructed, the transparent layer 20 has a lens effect because of surface tension and provides shadow for the concave and convex portions 21, 22 of the decorative face 23, thus so emphasizing solidness as to express something deep that has not been expressible. When the transparent layer 20 is poured onto the base 29 and moistened by making contact with the decorative face 23, bubbles are apt to be produced at the corner edge of the rugged portion as the air on the surface of the decorative face 23 is taken in. However, the roundness of 0.2 R at the corner edge 24 of each of the concave and convex portions 21, 22 allows synthetic resin to be poured without the intrusion of bubbles from the corner edge 24 of the rugged portion when the viscosity, setup characteristics and pouring amount of the resin, and the width of the base are taken into consideration.

Assuming the bubbles are dragged in, bubbles are hardly produced at the corner edge 24 but caused to fly out of the surface as the viscosity of the transparent layer 20 decreases, whereby bubbles are never left in the unhardened transparent layer 20 as before. Test results also proved that the roundness of the corner edge 24, provided it is over 0.2 R, always acted on bubbles. Although it is possible to set up conditions under which bubbles are not allowed to remain even if the roundness is lower than 0.2 R, depending on the visicosity, setup characteristics and the pouring amount of synthetic resin, and the width of the base, the corner edge 24 of each of the concave and convex portions 21, 22 should preferably have a roundness of 0.2 R in consideration of schedule control and the stability of the control. For caution's sake, some effect might be achieved by beveling the corner edge 24 of each of the concave and convex portions 21, 22 at 45 degrees.

Since no bubbles are left in the transparent layer 20, the surface thereof is prevented from producing sink marks and waves because of the change of the volume as the bubble temperature changes.

Moreover, the polyurethane resin poured is allowed to bear the ultimate contour shown in FIG. 10 before its viscosity rises as the crosslinking reaction progresses by heating the unhardened resin and the base 29 to 40° C.~80° C. when the transparent layer 20 is molded, whereby the upper central portion of the transparent layer 20 can be made flat without ruggedness.

As set forth above, since the decorative member having the transparent layer with a lens effect is provided with chevron projections emphasizing the intersection of faces constituting the decorative face on each boundary according to the present invention, the projection is emphasized by the lens effect of the transparent layer and looks as if it were bent at a sharp angle.

Moreover, by arranging the boundaries as those of characters of figures, the effect of having the characters or figures separated from the faces forming them is manifested In consequence, it becomes possible to obtain a decorative design which differs in features from what is attributed to the flat decorative face of the base.

We claim:

1. A decorative member comprising a base means having a decorative face on a surface thereof, said decorative face having more than one face section;

a layer of transparent material formed over the decorative face of said base means; and at least one chevron shaped projection extending from the decorative face of said base means to form a boundary between two of said face sections, whereby the optical effect provided by the transparent material highlights the definition of said boundary.

2. A decorative member according to claim 1, wherein at least one of said face sections is disposed at an angle with respect to another of said face sections, whereby said projection facilitates the formation of a rounded surface on said layer of transparent material.

3. A decorative member according to claim 2, wherein each of said faces has a character formed thereon, said projections highlighting the boundaries between said characters.

4. A decorative member according to claim 1, wherein said decorative face has a plurality of convex portions therein to eliminate trapped air bubbles during the formation of said layer of transparent material.

* * * * *